United States Patent [19]

Oster

[11] Patent Number: 4,468,159
[45] Date of Patent: Aug. 28, 1984

[54] DRILL PRESS AND STAND

[76] Inventor: Stanley M. Oster, 6951 NW. 15 Ave., Fort Lauderdale, Fla. 33309

[21] Appl. No.: 327,763

[22] Filed: Dec. 7, 1981

[51] Int. Cl.³ ........................ B23B 41/00; B23B 39/14
[52] U.S. Cl. ...................................... 408/56; 408/76; 408/112; 408/236; 125/20
[58] Field of Search ................... 408/56, 76, 236, 112; 125/20

[56] References Cited

U.S. PATENT DOCUMENTS

| | | | |
|---|---|---|---|
| 1,994,516 | 3/1935 | Hawn | 408/56 |
| 2,038,422 | 4/1936 | Decker | 408/236 |
| 2,140,901 | 12/1938 | Etzenhouser | 408/76 |
| 2,151,205 | 3/1939 | Hawn | 408/76 |
| 2,310,759 | 2/1943 | Clawson | 408/236 |
| 2,477,916 | 8/1949 | Wilhide | 408/236 |
| 2,680,435 | 6/1954 | Gonzalez | 408/56 |
| 2,938,411 | 5/1960 | Herfurth | 408/76 |
| 3,456,738 | 7/1969 | Harry | 408/76 |
| 3,591,301 | 7/1971 | Kaser | 408/56 |
| 3,907,452 | 9/1975 | Tripp | 408/56 |
| 4,072,440 | 2/1978 | Glover | 408/112 |

*Primary Examiner*—Leonidas Vlachos
*Assistant Examiner*—Jerry Kearns
*Attorney, Agent, or Firm*—Malin, Haley & McHale

[57] ABSTRACT

A drill press and stand providing an improved apparatus for cutting holes in plate vitreous material. The drill press includes a drill motor, a drill tool attached to the drill motor for cutting through the work piece, and a motor support interconnecting to and supporting the drill motor on the stand. The stand includes a base which is attachable to the work surface by a large suction cup which is attached to the lower surface of the stand base. The stand also includes a collar integral to and generally perpendicular to the upper surface of the base into which a mating drill press standard, a part of the motor support may be inserted. The motor support also includes a positioning mechanism for longitudinally moving the drill motor along the standard and may include a biasing spring to counteract the weight of the motor, etc. The standard, along with the attached drill motor, may be pivoted about its longitudinal axis within the mating collar to allow drilling two holes at fixed distances apart through the work surface without repositioning the stand. The base includes a cutting coolant reservoir drill tool access hole which traps coolant inserted therein atop the work surface and around the hole cutting tool. A resilient coolant retaining ring fixed to the lower surface of the base just outside the perimeter of the tool access hole presses against the work surface as the stand is attached to the work surface, forming a liquid seal for the reservoir.

4 Claims, 6 Drawing Figures

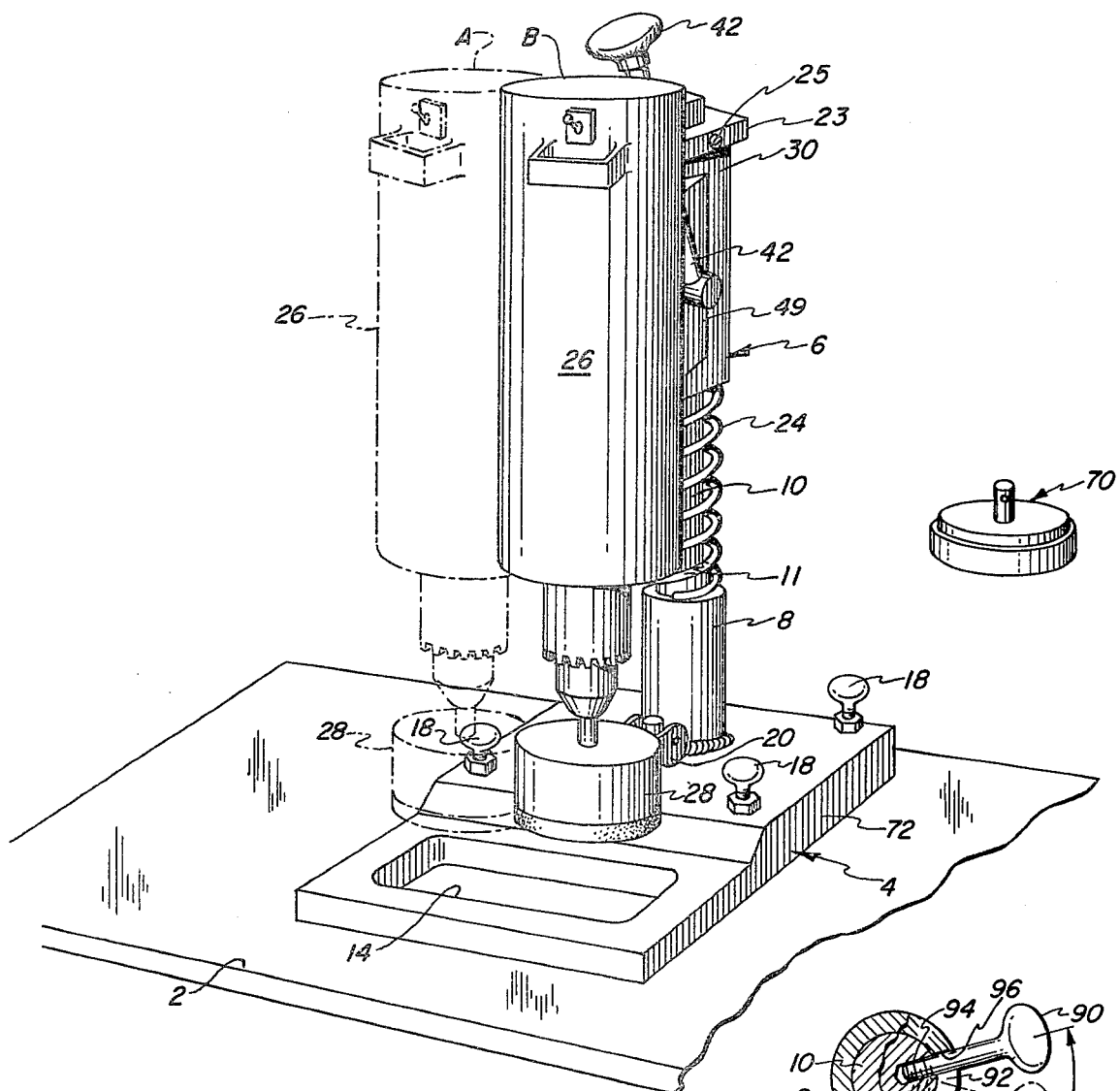
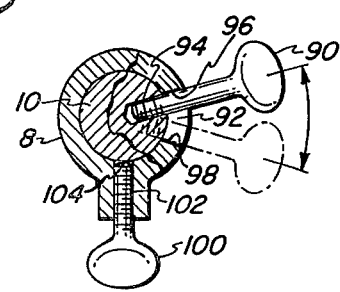
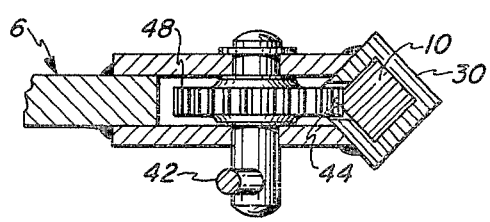
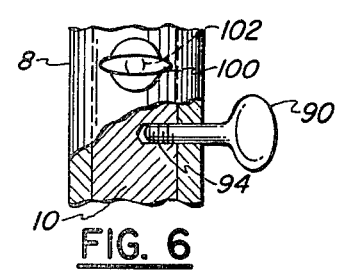

DRILL PRESS AND STAND

BACKGROUND OF THE INVENTION

In the past, when it was desired to cut an opening in a sheet of plate vitreous material such as glass or mirror, a carbide-tipped drill tool bit was used. Holes were drilled through the glass in regularly spaced intervals along the perimeter of the desired opening. A groove was then scored between each adjacent hole with a hand-held diamond-tipped cutting tool. A perimeter was thus formed by the holes and grooves in the glass encompassing the material to be removed. This unwanted section of glass was then carefully broken out of the work sheet.

This very old method of making an opening in plate glass or mirrors was tedious and time consuming. The resulting opening could be jagged and uneven unless it was cut by an experienced glass cutter and/or ground smooth after breaking away the unwanted section. With this method, the entire sheet of glass could crack or break while removing the unwanted section of glass, destroying the value of costly material.

Another more recent method was to drill a first relatively large hole, then reposition the entire drilling apparatus in relation to the work surface after which a second adjacent hole of the same size is drilled. A hand glass cutting tool is then used to score a pair of tangent lines between the two holes after which the glass remaining between the holes is broken away.

There was also a problem in placing the sheet of glass to the drill press stand and holding it in place while drilling without cracking the glass. Clamps tended to hold the glass so tightly that they cracked the glass, or so loosely that the glass would shift, causing inaccuracy in the placement of the drilled holes. In U.S. Pat. No. 2,151,205, reslient suction cups were incorporated to attach the ceramic drill to the work surface, providing secure attachment to the work surface, but had to be disengaged then reattached to drill each additional hole.

A cooled, lubricated drill tool cuts through the glass faster, and leaves a neater hole. In the past, the drill bit had to be cooled while drilling manually and applying coolant against the drill bit at the work surface. Coolant had to be constantly added because the drill bit tends to disperse the coolant as it rotates.

BRIEF SUMMARY OF THE INVENTION

This drill press and stand feature a suction cup base that allows the drill press stand to be firmly mounted onto a smooth sheet of vitreous material. The drill press may then be pivotally positioned about the axis of the standard, which is insertable into and supported by a stand collar, then indexed into proper alignment over the opening desired in the glass. The rubber suction cup on the underside of the base offers a quick and simple method for securely holding the stand in position without the danger of cracking the glass. The stand includes coolant retaining ring in the base around the lower surface perimeter of a drill tool access hole or coolant reservoir through the base. The coolant retaining ring is pressed against the work surface when the base is secured in place, forming a liquid seal therebetween. The drill tool access hole may then be filled with coolant after which the drill is swiveled into one of the two indexing positions so that the drill tool cutting edge, inmersed in coolant, may more effectively cut through the work surface.

After one hole has been bored through the work piece, the drill tool is removed from the hole as a rubber plug is inserted therein so that the liquid coolant may be saved or so that spilled coolant may be replaced in preparation for boring the second hole directly adjacent the plugged hole within the perimeter of the reservoir. After removing the drill tool from the first hole by raising the drill press perpendicularly away from the work surface the drill press is then pivoted about the axis of the standard to index the cutting tool into the second position to drill the second hole without the necessity of relocating the base. This next hole is also located within the drill access hole in the base wherein coolant is held.

After the two adjacent holes have been made, the remnants of glass still remaining therebetween may be removed easily using the conventional means previously described: that is, by scoring and breaking out add/or grinding. However, because substantially more of the perimeter of the desired hole now has a finished edge as opposed to that provided by the very early technique, the final clean up operation is substantially simplified. In the short time that this invention has been available, it has been wellreceived in the industry.

It is an object of this invention to provide an improved means of cutting two adjacent holes in vitreous materials.

It is another object of this invention to provide a suction means for securely attaching the base of the invention to the work surface without damaging the work piece.

It is yet another object of this invention to provide a built-in coolant reservoir-forming capability as the invention is attached to the work surface which will retain coolant and cool the drill tool, increasing its cutting effectiveness during the drilling process.

It is still another object of this invention to provide a means for plugging the first hole drilled to enable continued entrapment of the coolant for drilling the second adjacent hole.

In accordance with these and other objects which will be apparent hereinafter, the instant invention will now be described with particular reference to the accompanying drawings.

BRIEF DESCRIPTION OF THE DRAWINGS

FIG. 1 is an isometric view of the entire invention, including the plug attached to a vitreous work surface, showing the two alternate positions in which the drill press may be located.

FIG. 4 is a sectional plan view of the invention through Section 4—4 of FIG. 2, showing the standard and motor positioning means.

FIG. 5 is a partially broken sectional plan view of the base collar and standard therein showing an alternate indexing means.

FIG. 6 is an elevational side view of the alternate indexing means shown in FIG. 5.

PREFERRED EMBODIMENT OF THE INVENTION

Figure 2:
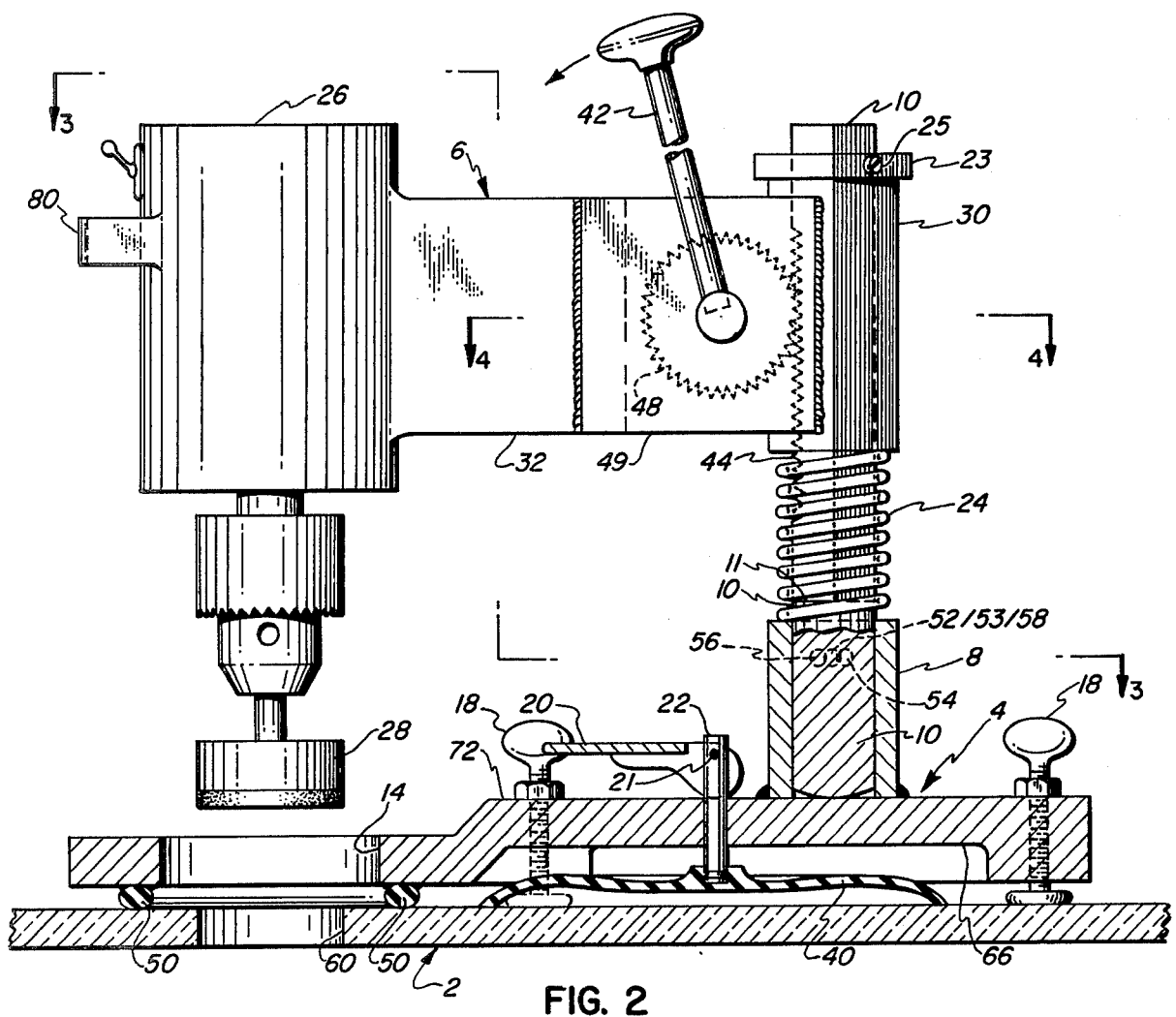
FIG. 2 is a partially broken elevational side view of the invention attached to a vitreous work surface.

Referring now to the drawings and particularly to FIG. 1, the invention is shown attached to the work surface 2. The invention includes stand 4, drill press 6 and plug 70. The stand includes base 72, levelling screws 18 operably positioned in the base to provide proper alignment of drill tool axis to the plane of the work surface and a coolant reservoir 14 through the base which allows drilling tool 28 to have access to the work surface. The stand also includes a collar 8 integral and generally perpendicular to the upper surface of the base. The collar receives and supports drill press 6, which includes standard 10, drill motor 26, connecting means 32 seen in FIG. 2, and standard engaging tube 30, which interconnects the drill motor and the standard.

Drill motor 26 is moved linearly toward and away from the stand and work surface by slidably moving the standard engaging tube longitudinally along the standard. This is accomplished by rotating handle 42, which is connected to a pinion gear 48 seen in FIG. 2 internal to the gear housing portion 49 of the standard engaging tube. Also in FIG. 2, the pinion gear engages a mating rack 44 integral to one side of a portion of the length of the standard providing a full range of movement for the drill motor. The upper portion of the standard has a square cross section to prevent relative rotational movement between the standard and the standard engaging tube. A biasing means 24 is connected between the movable standard engaging tube 30 and the stand collar 8 which counteracts the weight of the drill motor. A stop 23 is provided which is securable to the standard by a set screw 25 and prevents the standard engaging tube from being raised excessively by the biasing means. At numeral 11 in FIG. 2, the standard becomes circular in cross section to provide the drill press pivoting function within the collar. The drill press may also include a pivotal positioning handle 80 attached, for example, to the motor.

Figure 3:
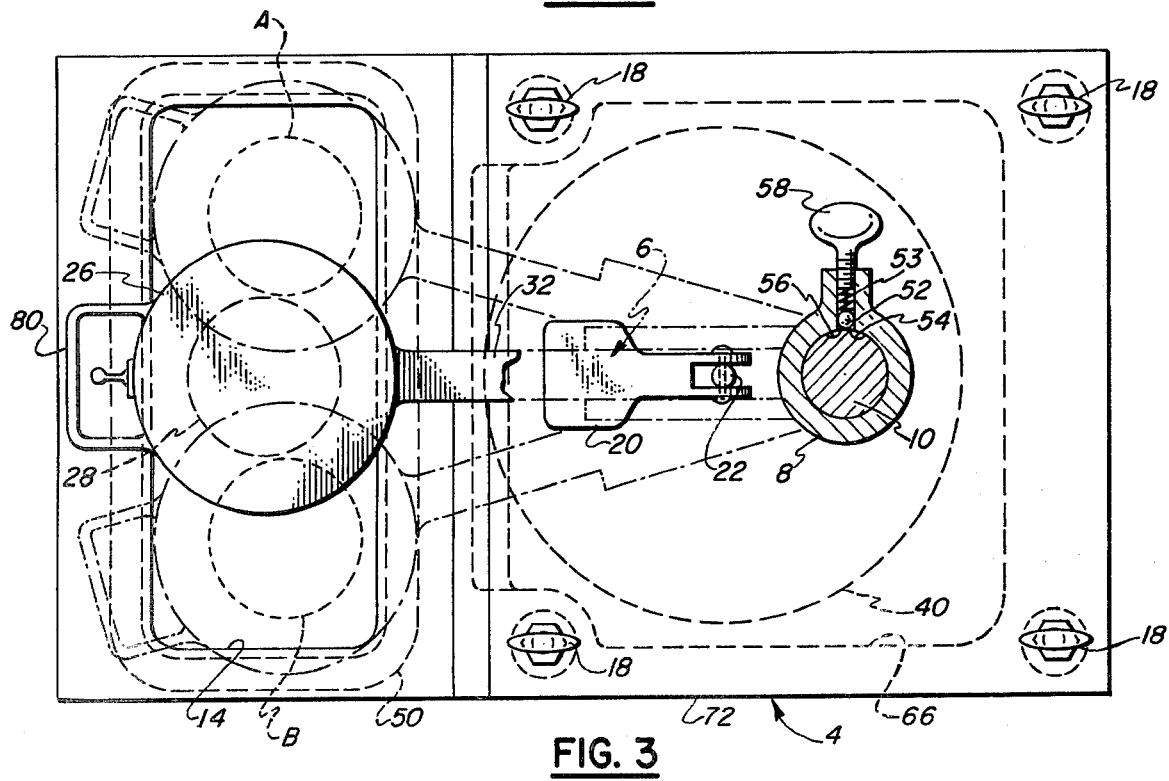
FIG. 3 is a plan view of the invention through Section 3—3 of FIG. 2, showing two alternate positions in which the drill press may be located for drilling within the coolant reservoir and depicting the means for locking the drill press standard into the stand collar.

Referring now to FIGS. 2, 3 and 4, as the stand 4 is placed against the work material 2, a continuous resilient ring 50, attached to the lower surface of base 72 just outside the perimeter of the coolant reservoir 14, contacts the work surface, forming a liquid seal therebetween. Thereafter, liquid coolant may be poured into the reservoir in preparation for the hole cutting process. As the drill motor is moved toward the work surface, drill tool 28 passes into the entrapped coolant, then engages the work surface to be drilled. As the drill motor is downwardly advanced by rotating handle 42, the drill tool, continuing to cut through the work surface, is cooled by the coolant.

Cavity 66 is provided to accommodate the mounting suction cup 40. By well-known means, to lock the stand in place, suction lever 20 is pivoted to the position shown in FIG. 2, thus withdrawing shaft 22 to which the lever is pinned at 21, from the thru-hole in the base and raising the center of suction cup 40 to which the shaft is attached at its lower end. In conjunction with attaching the stand to the work surface, levelers 18 are adjusted to provide proper alignment of the drill motor axis to the plane of the work piece and proper engagement of the coolant retaining ring to the work surface.

The standard includes an adjustable indexing knob 58 which is threaded into a threaded receptacle integral and perpendicular to the collar. The knob compresses a spring or biasing means 53 which urges spherical indexing ball 52 against the standard. The ball, somewhat larger than a pair of indexing holes 54 and 56 in the standard, engages the indexing holes alternately as the drill motor is moved to either position A or B in FIG. 3. This has the effect of pivotally positioning and securing the drill press in either of positions A or B in preparation for hole cutting within the perimeter of the reservoir. The degree of rigidity required of the drill press varies according to the tightness of the knob 58.

An alternate indexing means is shown in FIGS. 5 and 6. Indexing shaft 90 is threadably engageable into standard 10 and tightly secured therein. The indexing shaft 90 passes through a slot 92 in the collar 8. Slot 92 is sized and positioned to provide end stops 96 and 98 which limit the rotation of the standard so as to properly provide the two desired drill tool indexing positions within the reservoir. Friction means 100, threadably engaged into the collar at numeral 102, provides a steadying means for the drilling operation by pressing against the standard at numeral 104 as knob 100 is properly rotated.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. An apparatus for drilling by a drilling means holes through vitreous sheet materials comprising:
   a stand having a base, a suction mounting means, a coolant reservoir, a drill press supporting collar, a plurality of leveling screws and a drill press means;
   said suction mounting means operably connected to said base, said suction mounting means constructed and arranged for holding said base securely against the upper surface of the vitreous sheet materials;
   said coolant reservoir including an opening for viewing the drilling operation and for the passage of the drilling means said coolant reservoir including a dam attached to said base;
   said dam forming a continuous liquid seal over the entire perimeter of said dam;
   said dam having at least a resilient contacting surface for contacting the vitreous sheet material over the entire perimeter of said dam when said base is attached to the vitreous sheet material by said suction mounting means, said contacting surface sufficiently sealing the perimeter of said dam to produce a liquid seal between the vitreous sheet material and said dam;
   said supporting collar connected to said base;
   said leveling screws connected to said base and operably mounted to provide proper alignment of said base and said supporting collar to the vitreous sheet materials being drilled, said leveling screws having lower ends that contact the vitreous sheet material; and
   said drill press means including a means for linearly positioning said drill press means axis generally perpendicularly to said base and for moving said drill press means toward or away from the upper surface of the vitreous sheet material;
   said drill press means having a motor, a drill tool means operably attachable to said motor, a motor support means interconnectable between said motor and said stand;
   said collar including a means for index positioning said drill press means in relation to said collar in one of two drill positions about the pivotal axis of said support mounting means for quick positioning:
said two drill positions located to provide adjacent drill alignment within said coolant reservoir.
said drill sized to cut a hole of a preselected diameter;
said two drill positions located a preselected radial distance apart about said pivotal axis;
said two drill positions, said preselected raidal distance, and said preselected diameter each selected so that by cutting said hole through said vitreous sheet material at each of said two drill positions the resulting holes are adjacent to one another.

2. An apparatus as set forth in claim 1 wherein said motor support means includes:
a standard, said standard insertable into and supported by said collar;
a standard engaging tube, said tube slidably matable over said standard;
a motor support bracket, said bracket interconnected between said motor and said tube; and
a biasing means interconnected between said tube and said collar to counterbalance the weight of said motor, bracket and tube;
said linear positioning means including a pinion gear mounted in said tube, a mating gear-toothed rack along a longitudinal surface of said standard and a rotating means attached to said pinion gear for rotating said gear;
said linear positioning means preventing relative rotational movement between said standard and said tube;
said pinion gear and said rack each operably positioned to provide said linear position in response to movement of said rotating means.

3. An apparatus as set forth in claim 2 wherein said means for index positioning said motor support means in said supporting collar includes:
a hole of predetermined length perpendicular to and through the wall of said collar;
a pair of holes partially through and perpendicular to the longitudinal axis of said standard;
said holes in said standard cooperatively aligning with said hole in said collar;
a shaft having a knob attached to said first end of said shaft;
said second end engageable through said hole in said collar;
a biasing means within said hole having a first and second end, said first end of said biasing means positioned in contact with said second end of said biasing means;
said detent ball somewhat larger than said pair of holes.

4. An apparatus as set forth in claim 2, wherein said means for index positioning said motor support means in said supporting collar includes:
an indexing shaft, said indexing shaft having a means for rotating said indexing shaft at one end and having external means on the opposite end of said indexing shaft;
a slot through the wall of said collar through which said indexing shaft may pass;
a hole in said standard, said hole operably positioned to receive said indexing shaft as said indexing shaft passes through said slot;
said slot operably positioned in said collar to limit rotation of said standard by contact of said indexing shaft to either end of said slot; and
a friction shaft, said friction shaft having a means for rotating said friction shaft at one end and having external means on the opposite end of said friction shaft;
said friction shaft threadably engageable through a threaded hole in said collar to allow the threaded end of said friction shaft to press against said standard, providing resistance to rotation of said standard in said collar.

* * * * *